US011340863B2

(12) United States Patent
Kopparapu et al.

(10) Patent No.: US 11,340,863 B2
(45) Date of Patent: May 24, 2022

(54) SYSTEMS AND METHODS FOR MUTING AUDIO INFORMATION IN MULTIMEDIA FILES AND RETRIEVAL THEREOF

(71) Applicant: Tata Consultancy Services Limited, Mumbai (IN)

(72) Inventors: Sunil Kumar Kopparapu, Thane (IN); Ashish Panda, Thane (IN)

(73) Assignee: Tata Consultancy Services Limited, Mumbai (IN)

( * ) Notice: Subject to any disclaimer, the term of this patent is extended or adjusted under 35 U.S.C. 154(b) by 134 days.

(21) Appl. No.: 16/801,244

(22) Filed: Feb. 26, 2020

(65) Prior Publication Data

US 2020/0310746 A1 Oct. 1, 2020

(30) Foreign Application Priority Data

Mar. 29, 2019 (IN) .............................. 201921012441

(51) Int. Cl.
*G06F 3/16* (2006.01)
*G06F 16/432* (2019.01)
*G06F 16/48* (2019.01)

(52) U.S. Cl.
CPC ............ *G06F 3/165* (2013.01); *G06F 16/433* (2019.01); *G06F 16/489* (2019.01)

(58) Field of Classification Search
CPC . G06F 3/16; G06F 3/162; G06F 3/165; G06F 3/167; G06F 16/433; G06F 16/486; G06F 21/6245; G10L 21/06; G10L 21/10; G10L 15/1822

See application file for complete search history.

(56) References Cited

U.S. PATENT DOCUMENTS

| 9,377,991 | B1 * | 6/2016 | Rapport | ................ G06F 16/438 |
| 10,305,683 | B1 * | 5/2019 | Ghafourifar | .......... H04L 9/0816 |
| 10,468,026 | B1 * | 11/2019 | Newman | ................. G10L 15/04 |
| 10,970,414 | B1 * | 4/2021 | Lesner | .................. G06F 40/242 |
| 11,024,299 | B1 * | 6/2021 | Drake | ................. G06F 21/6245 |

(Continued)

FOREIGN PATENT DOCUMENTS

| CN | 109346092 A | 2/2019 |
| EP | 3 598 444 A1 | 1/2020 |

(Continued)

*Primary Examiner* — Thomas H Maung
(74) *Attorney, Agent, or Firm* — Finnegan, Henderson, Farabow, Garrett & Dunner, LLP

(57) ABSTRACT

Audio based transactions are getting more popular and are envisaged to become common in years to come. With the rise in data protection regulations, muting portions of the audio files is necessary to hide sensitive information from an eavesdropper or accidental hearing by an entity who gets unauthorized access to these audio files. However, it is realized that deleted transaction information in a muted audio files make audit of the transaction challenging and impossible. Embodiments of the present disclosure provide systems and methods of muting audio information in multimedia files and retrieval thereof which is masked and further allows for reconstruction of the original audio conversation or restoration Private to an Entity (P2aE) information without original audio reconstruction when auditing is being exercised.

12 Claims, 8 Drawing Sheets

(56) References Cited

U.S. PATENT DOCUMENTS

| | | | | |
|---|---|---|---|---|
| 2007/0030528 A1* | 2/2007 | Quaeler | ............... | G06F 21/6254 |
| | | | | 358/453 |
| 2009/0279735 A1* | 11/2009 | Levy | ................. | H04N 1/32203 |
| | | | | 382/100 |
| 2013/0266127 A1* | 10/2013 | Schachter | ........... | H04M 3/5175 |
| | | | | 379/88.01 |
| 2014/0185862 A1* | 7/2014 | Kamath | ............. | G06Q 20/3829 |
| | | | | 382/100 |
| 2015/0205570 A1* | 7/2015 | Johnston | ............ | G06F 3/04845 |
| | | | | 715/716 |
| 2015/0208233 A1* | 7/2015 | Rui | ..................... | G06F 21/6245 |
| | | | | 726/26 |
| 2015/0348538 A1* | 12/2015 | Donaldson | .............. | G10L 17/22 |
| | | | | 704/235 |
| 2017/0124336 A1* | 5/2017 | Freudiger | ........... | G06F 21/6254 |
| 2018/0276393 A1* | 9/2018 | Allen | ..................... | G06F 21/602 |
| 2019/0005952 A1* | 1/2019 | Kruse | .................... | G10L 25/51 |
| 2019/0238516 A1* | 8/2019 | Weggenmann | ..... | G06F 21/6254 |
| 2019/0348066 A1* | 11/2019 | Funakoshi | .............. | G10L 25/78 |
| 2019/0377900 A1* | 12/2019 | Balzer | ................ | G06F 21/6254 |
| 2020/0110903 A1* | 4/2020 | Reilly | ................. | H04N 1/4446 |
| 2020/0226231 A1* | 7/2020 | Kumar | ................ | G06F 21/6254 |
| 2020/0335121 A1* | 10/2020 | Mosseri | ............ | G06K 9/00718 |
| 2021/0249032 A1* | 8/2021 | Smith | .................... | G10L 21/14 |

FOREIGN PATENT DOCUMENTS

| | | |
|---|---|---|
| ES | 2 588 483 | 11/2016 |
| JP | 2010-74391 A | 4/2010 |

\* cited by examiner

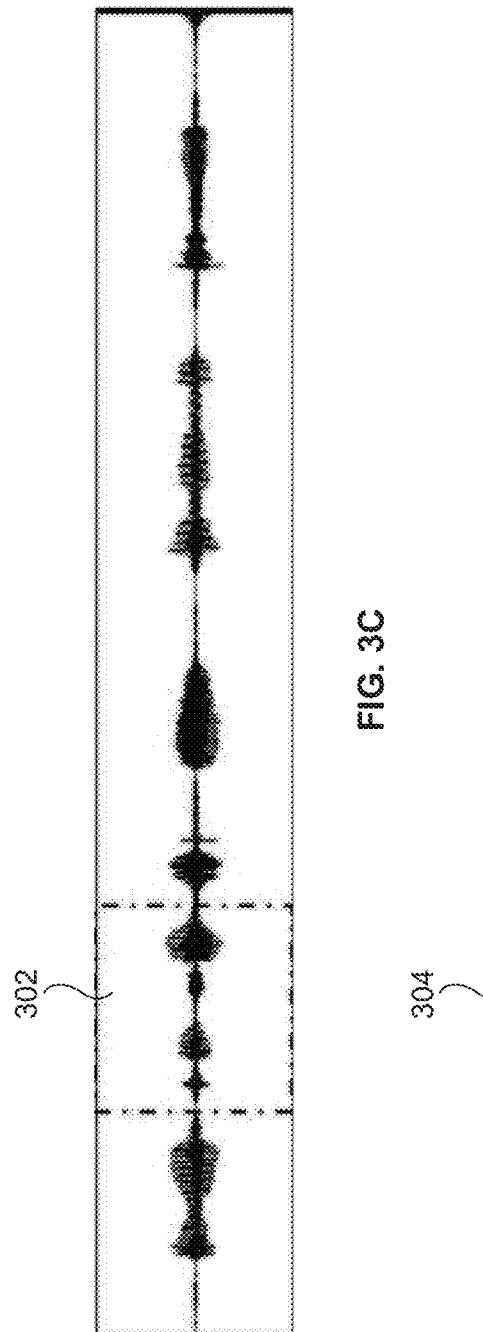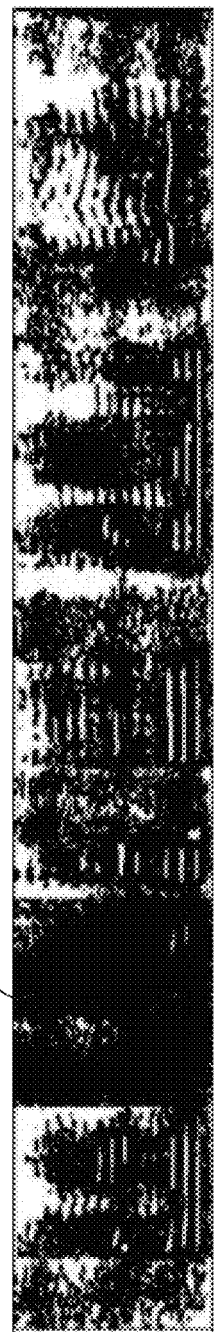
FIG. 3C
FIG. 3D

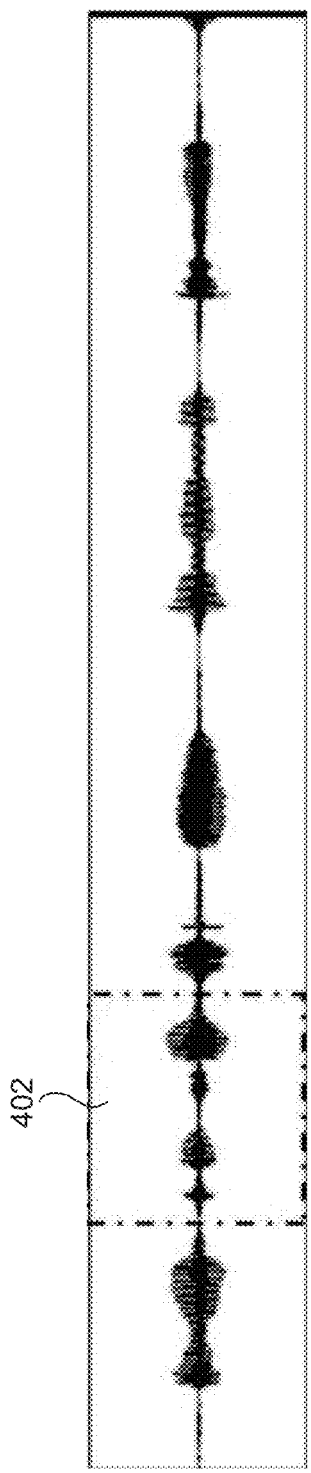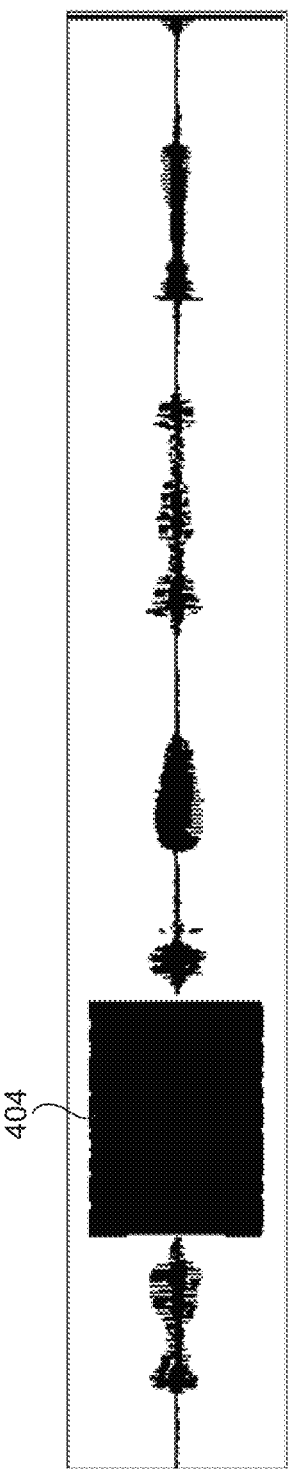

SYSTEMS AND METHODS FOR MUTING AUDIO INFORMATION IN MULTIMEDIA FILES AND RETRIEVAL THEREOF

This U.S. patent application claims priority under 35 U.S.C. § 119 to: India Application No. 201921012441, filed on Mar. 29, 2019. The entire contents of the aforementioned application are incorporated herein by reference.

TECHNICAL FIELD

The disclosure herein generally relates to muting techniques, and, more particularly, to systems and methods for muting audio information in multimedia files and retrieval thereof.

BACKGROUND

Audio conversations between multiple parties (e.g., users) are common in almost all voice based services provided by various service providers and the conversation are most often recorded in accordance with the law of the land especially to resolve any dispute that may occur with respect to the conversation. These audio conversations almost always contain sensitive information such as date of birth, select digits of payment card, and the like. The sensitive information are sought by an agent, during the course of the conversation, from a customer to provide personalized services to the customer.

With the introduction to data protection regulations, it has been mandated that a service provider may not retain any sensitive information other than what is necessary to provide service to the customer. To acknowledge the data protection regulations, muting of sensitive information in these conversation has been adopted. However, most traditional systems that exists today perform muting of portion of audio conversation with silence (e.g., no speech, mute) or append noise wherein the sensitive information gets masked. If at all at a later stage one needs to retrieve the muted sensitive information, what is extracted will only be noise and of no use thus making the auditing challenging during any disputes.

SUMMARY

Embodiments of the present disclosure present technological improvements as solutions to one or more of the above-mentioned technical problems recognized by the inventors in conventional systems. For example, in one aspect, there is provided a processor implemented method for muting audio information in multimedia files and retrieval thereof. The processor implemented method comprises receiving conversation between multiple users, wherein the conversation is obtained from a multimedia file comprising an audio file or a video with the audio file; analyzing the conversation to identify Private to an Entity (P2aE) text information in the conversation; determining a mapping of the Private to an Entity (P2aE) text information and corresponding actual location and duration thereof in the audio file; assigning a marker to the actual location and duration of the P2aE text information in a spectrogram created from the audio file; extracting a spectrogram image of an extracted audio file (that needs to be muted) obtained based on the marker being assigned, wherein the extracted audio file is a portion of the received audio file; creating an image of the P2aE text information, and encrypting the image thereof to obtain an encrypted image; substituting portion of the extracted spectrogram image of the extracted audio file with the encrypted image based on the actual location and the duration specific to the P2aE text information to obtain a modified spectrogram; and reconstructing the audio file using the modified spectrogram to obtain a reconstructed audio file.

In an embodiment, the step of analyzing the conversation to identify Private to an Entity (P2aE) text information in the conversation comprises performing analysis of inter and intra text information within the conversation.

In an embodiment, size of the created image of the P2aE text information is identical to duration of the extracted audio file.

In an embodiment, the processor implemented method may further comprise generating a spectrogram of the reconstructed audio file; and decrypting the actual location and duration of the P2aE text information from the spectrogram of the reconstructed audio file using an associated decryption key to obtain an interpretable P2aE text information. In an embodiment, the interpretable P2aE text information is of an image format.

In another aspect, there is provided a system for muting audio information in multimedia files and retrieval thereof. The system comprises a memory storing instructions; one or more communication interfaces; and one or more hardware processors coupled to the memory via the one or more communication interfaces, wherein the one or more hardware processors are configured by the instructions to: receive conversation between multiple users, wherein the conversation is obtained from a multimedia file comprising an audio file or a video with the audio file; analyze the conversation to identify Private to an Entity (P2aE) text information in the conversation; determine a mapping of the Private to an Entity (P2aE) text information and corresponding actual location and duration thereof in the audio file; assign a marker to the actual location and duration of the P2aE text information in a spectrogram created from the audio file; extracting a spectrogram image of an extracted audio file (that needs to be muted) obtained based on the marker being assigned, wherein the extracted audio file (that needs to be muted) is a portion of the received audio file; creating an image of the P2aE text information, and encrypting the image thereof to obtain an encrypted image; substitute portion of the extracted spectrogram image of the extracted audio file with the encrypted image based on the actual location and the duration specific to the P2aE text information to obtain a modified spectrogram; and reconstruct the audio file using the modified spectrogram to obtain a reconstructed audio file.

In an embodiment, the conversation is analyzed to identify Private to an Entity (P2aE) text information in the conversation by performing analysis of inter and intra text information within the conversation.

In an embodiment, size of the created image of the P2aE text information is identical to duration of the extracted audio file.

In an embodiment, the one or more hardware processors are further configured by the instructions to generate a spectrogram of the reconstructed audio file; and decrypt the actual location and duration of the P2aE text information from the spectrogram of the reconstructed audio file using an associated decryption key to obtain an interpretable P2aE text information. In an embodiment, the interpretable P2aE text information is of an image format.

In yet another aspect, there are provided one or more non-transitory machine readable information storage mediums comprising one or more instructions which when executed by one or more hardware processors cause muting audio information in multimedia files and retrieval thereof, by: receiving conversation corresponding to multiple users, wherein the conversation is obtained from a multimedia file comprising an audio file or a video with the audio file; analyzing the conversation to identify Private to an Entity (P2aE) text information in the conversation; determining a mapping of the Private to an Entity (P2aE) text information and corresponding actual location and duration thereof in the audio file; assigning a marker to the actual location and duration of the P2aE text information in a spectrogram created from the audio file; extracting a spectrogram image of an extracted audio file (that needs to be muted) obtained based on the marker being assigned, wherein the extracted audio file is a portion of the received audio file; creating an image of the P2aE text information, and encrypting the image thereof to obtain an encrypted image; substituting portion of the extracted spectrogram image of the extracted audio file with the encrypted image based on the actual location and the duration specific to the P2aE text information to obtain a modified spectrogram; and reconstructing the audio file using the modified spectrogram to obtain a reconstructed audio file.

In an embodiment, the step of analyzing the conversation to identify Private to an Entity (P2aE) text information in the conversation comprises performing analysis of inter and intra text information within the conversation.

In an embodiment, size of the created image of the P2aE text information is identical to duration of the extracted audio file.

In an embodiment, the instructions which when executed by the one or more hardware processors may further cause generating a spectrogram of the reconstructed audio file; and decrypting the actual location and duration of the P2aE text information from the spectrogram of the reconstructed audio file using an associated decryption key to obtain an interpretable P2aE text information. In an embodiment, the interpretable P2aE text information is of an image format.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

FIG. 3C depicts marker assigned to actual location and duration of Private to an Entity (P2aE) text information in the input audio file, in accordance to an embodiment of the present disclosure.

FIG. 3D depicts a spectrogram wherein marker is assigned to actual location and duration of the P2aE text information in the spectrogram created from the input audio file, in accordance to an embodiment of the present disclosure.

FIG. 4A depicts the input audio file with noise portion in place of the extracted audio file, in accordance with an embodiment of the present disclosure.

FIG. 4B depicts a spectrogram of the input audio file with noise portion in accordance with an embodiment of the present disclosure.

DETAILED DESCRIPTION

Figure 1:
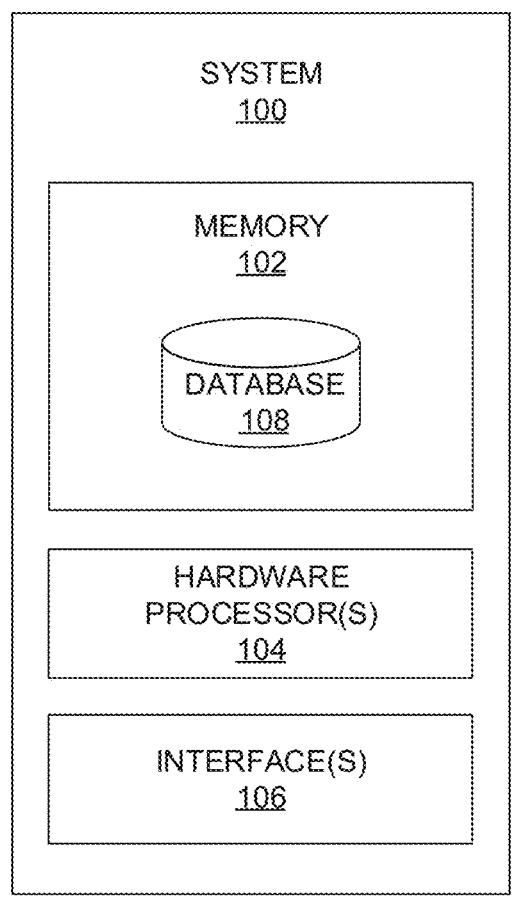
FIG. 1 illustrates an exemplary block diagram of a system for muting audio information in multimedia files and retrieval thereof, in accordance with an embodiment of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the scope of the disclosed embodiments. It is intended that the following detailed description be considered as exemplary only, with the true scope being indicated by the following claims.

As discussed above, audio based transactions are getting more popular and are envisaged to become common in years to come. With the rise in data protection regulations, muting portions of the audio files is necessary to hide sensitive information from an eavesdropper or accidental hearing by an entity who gets unauthorized access to these audio files. However, it is realized that deleted transaction information in a muted audio files make audit of the transaction challenging and impossible. Embodiments of the present disclosure provide systems and methods of muting audio information in multimedia files and retrieval thereof which is masked and further allows for reconstruction of the original audio conversation or restoration P2aE information without original audio reconstruction when auditing is being exercised.

Referring now to the drawings, and more particularly to FIGS. 1 through 5C, where similar reference characters denote corresponding features consistently throughout the figures, there are shown preferred embodiments and these embodiments are described in the context of the following exemplary system and/or method.

FIG. 1 illustrates an exemplary block diagram of a system 100 for muting audio information in multimedia files and retrieval thereof, in accordance with an embodiment of the present disclosure. The system 100 may also be referred as 'muting and retrieval system' or 'auditing system' and interchangeably used hereinafter. In an embodiment, the system 100 includes one or more processors 104, communication interface device(s) or input/output (I/O) interface(s) 106, and one or more data storage devices or memory 102 operatively coupled to the one or more processors 104. The one or more processors 104 may be one or more software processing modules and/or hardware processors. In an embodiment, the hardware processors can be implemented as one or more microprocessors, microcomputers, microcontrollers, digital signal processors, central processing units, state machines, logic circuitries, and/or any devices that manipulate signals based on operational instructions. Among other capabilities, the processor(s) is configured to fetch and execute computer-readable instructions stored in the memory. In an embodiment, the device 100 can be implemented in a variety of computing systems, such as laptop computers, notebooks, hand-held devices, workstations, mainframe computers, servers, a network cloud and the like.

The I/O interface device(s) 106 can include a variety of software and hardware interfaces, for example, a web interface, a graphical user interface, and the like and can facilitate multiple communications within a wide variety of networks N/W and protocol types, including wired networks, for example, LAN, cable, etc., and wireless networks, such as WLAN, cellular, or satellite. In an embodiment, the I/O interface device(s) can include one or more ports for connecting a number of devices to one another or to another server.

The memory 102 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment a database 108 can be stored in the memory 102, wherein the database 108 may comprise information, for example, audio files comprising conversation between multiple users/stakeholders, and the like. In an embodiment, the memory 102 may store (or stores) one or more techniques(s) (e.g., spectrogram generating technique(s), encryption and decrypting technique(s)), extracted audio files, muted audio files, encrypted files, decrypted files, audited information and the like. The above techniques which when executed by the one or more hardware processors 104 perform the methodology described herein. The memory 102 further comprises (or may further comprise) information pertaining to input(s)/output(s) of each step performed by the systems and methods of the present disclosure. More specifically, information pertaining to muting process, and retrieval thereof for auditing purpose (e.g., during disputes, and the like) may be stored in the memory 102.

Figure 2:
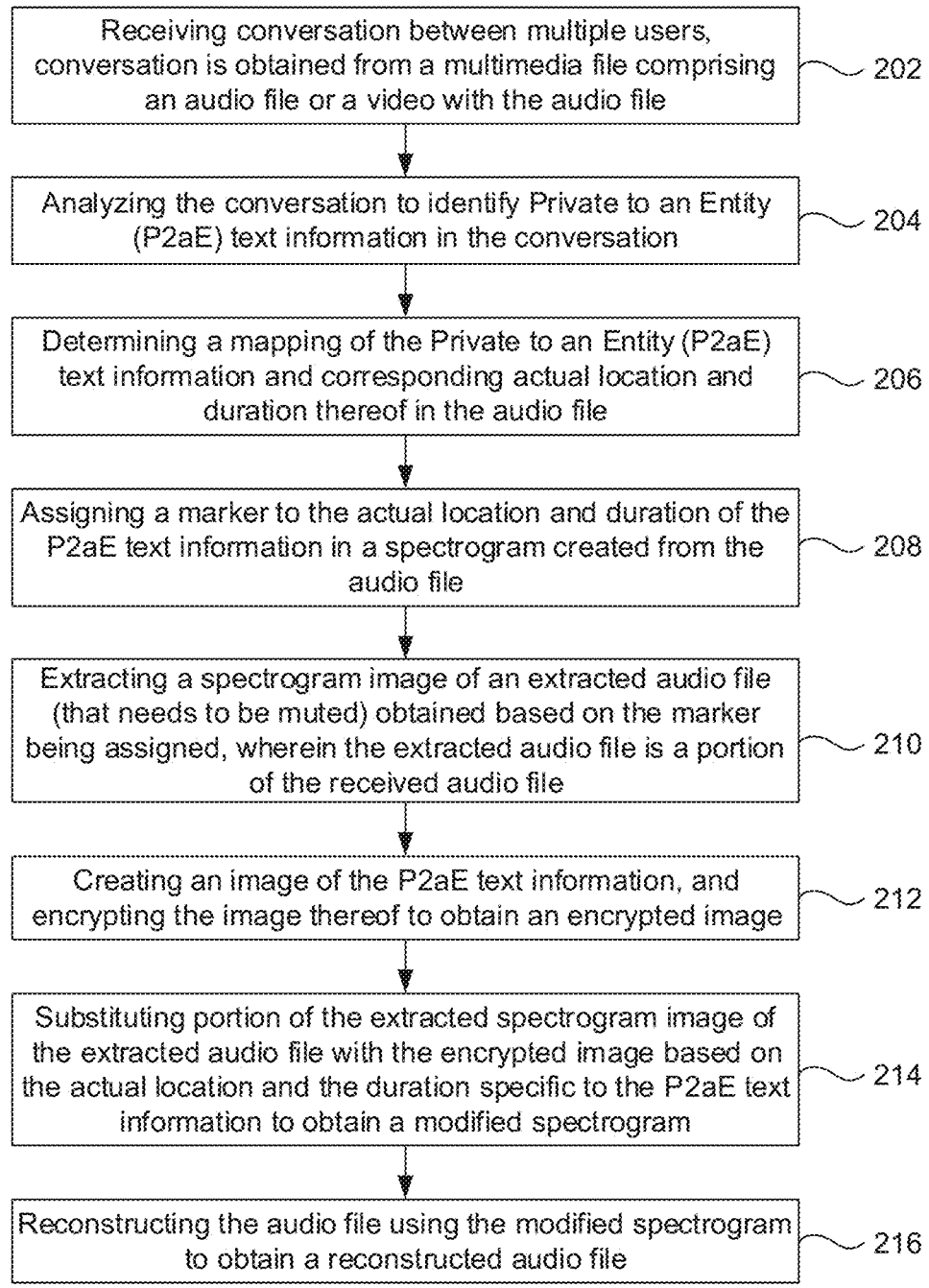
FIG. 2 illustrates an exemplary flow diagram of a method for muting audio information in multimedia files and retrieval thereof using the system of FIG. 1 in accordance with an embodiment of the present disclosure.
Figure 3A:
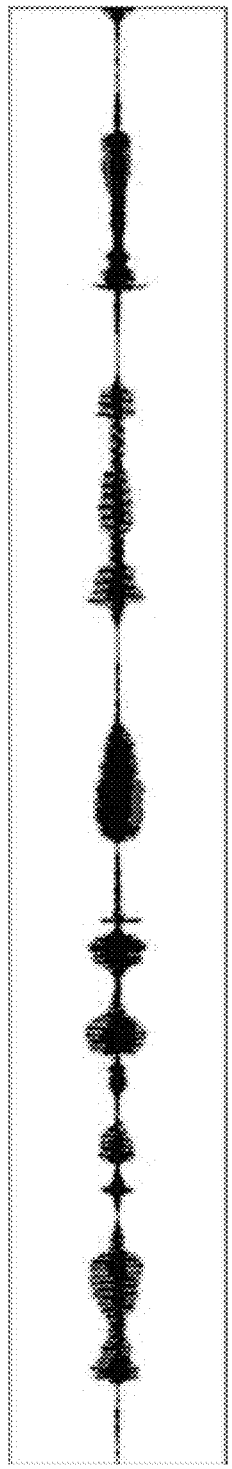
FIG. 3A illustrates an exemplary signal comprising conversation from an input audio file in accordance with an embodiment of the present disclosure.

FIG. 2, with reference to FIG. 1, illustrates an exemplary flow diagram of a method for muting audio information in multimedia files and retrieval thereof using the system 100 of FIG. 1 in accordance with an embodiment of the present disclosure. In an embodiment, the system(s) 100 comprises one or more data storage devices or the memory 102 operatively coupled to the one or more hardware processors 104 and is configured to store instructions for execution of steps of the method by the one or more processors 104. The steps of the method of the present disclosure will now be explained with reference to components of the system 100 of FIG. 1, the flow diagram as depicted in FIG. 2 and representations of FIGS. 3A-5C. In an embodiment of the present disclosure, at step 202, the one or more hardware processors 104 receive conversation between multiple users. The conversation may be obtained from a multimedia file wherein the multimedia file is an audio file or a video having the audio file, in an example embodiment. Example of audio file is depicted in FIG. 3A.

In an embodiment of the present disclosure, at step 204, the one or more hardware processors 104 analyze the conversation to identify Private to an Entity (P2aE) text information in the conversation. In an embodiment, the expression "P2aE text information" may also be referred as "Personal Identifiable Information" or "Personally Identifiable Information" (PII) and may be interchangeably used herein. Conversation is (or may be) analysed to identify the P2aE text information by performing analysis of inter and intra text information within the conversation. In other words, correlation (e.g., contextual relationship) may be determined across words in the conversation to identify that specific words are P2aE text information on the basis of action(s) to be taken (e.g., words to be muted, and the like). For instance, if there is word 'amount' then subsequent words may be compared with the word 'amount' for determining the context and predicting these words as P2aE text information or potential P2aE text information. P2aE text information may be referred as sensitive information and further examples may comprise but are not limited to, user name, date of birth, account information, user identifier, transaction details, and the like. In an embodiment of the present disclosure, at step 206, the one or more hardware processors 104 determine a mapping of the Private to an Entity (P2aE) text information and corresponding actual location and duration thereof in the audio file.

Figure 3B:
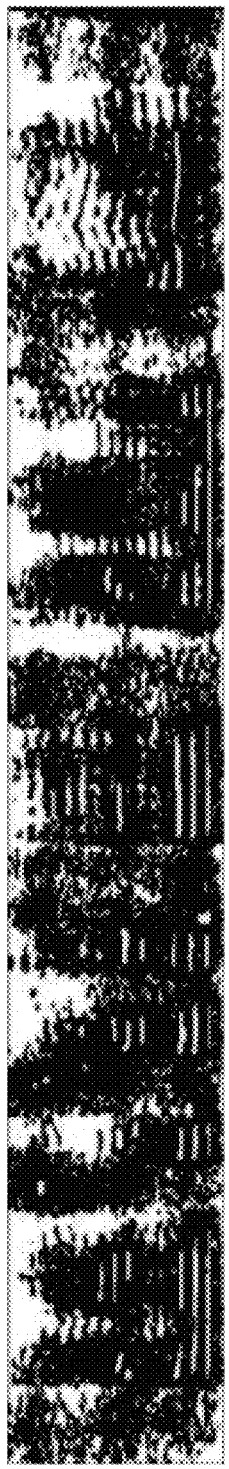
FIG. 3B depicts a spectrogram created from the input audio file, in accordance with an embodiment of the present disclosure.

In an embodiment of the present disclosure, at step 208, the one or more hardware processors 104 assigning a marker to the actual location and duration of the P2aE text information in a spectrogram created from the audio file. Prior to assigning marker, a spectrogram is created from the audio file. FIG. 3B, with reference to FIGS. 1 through 3A, depicts a spectrogram created from the input audio file, in accordance with an embodiment of the present disclosure. The spectrogram can be considered as an equivalent representation of an audio signal from the input audio file in the frequency domain. FIG. 3C, with reference to FIGS. 1 through 3B, depicts marker assigned to actual location and duration of the P2aE text information in the input audio file, in accordance to an embodiment of the present disclosure. More specifically, marker is depicted by way of a block 302 in FIG. 3C, in one example embodiment. FIG. 3D, with reference to FIGS. 1 through 3C, depicts a spectrogram wherein marker is assigned to actual location and duration of the P2aE text information in the spectrogram created from the input audio file, in accordance to an embodiment of the present disclosure. More specifically, spectrogram, for which the marker is assigned, is depicted by way of a block 304 in FIG. 3D, in one example embodiment. The marker is assigned to actual location and duration of the P2aE text information in the spectrogram created from the input audio file obtain a muted audio file.

Figure 3E:
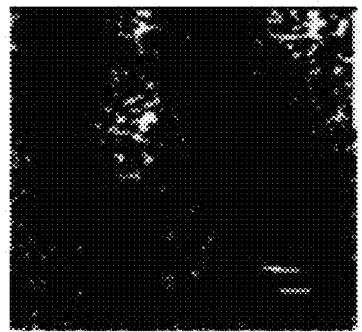
FIG. 3E depicts an extracted spectrogram image of an extracted audio file comprising the P2aE text information, in accordance to an embodiment of the present disclosure.
Figure 3F:
FIG. 3F depicts an image of the P2aE text information comprised in the extracted audio file, in accordance to an embodiment of the present disclosure.
Figure 3G:
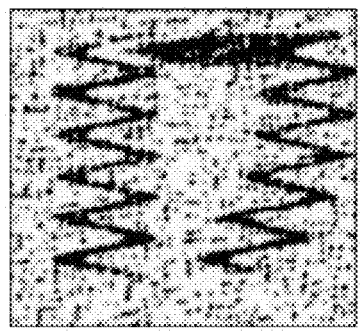
FIG. 3G depicts an encrypted image of the P2aE text information, in accordance to an embodiment of the present disclosure.

In an embodiment of the present disclosure, at step 210, the one or more hardware processors 104 extract a spectrogram image of an extracted audio file (or the muted audio file) obtained based on the marker being assigned in the created spectrogram. The extracted audio file is a portion of the received audio file (e.g., input audio file), wherein the portion comprises sensitive information or P2aE text information which is to be muted for retrieval during auditing purpose. In other words, the spectrogram image extracted from an extracted audio file that is to be muted is obtained based on the marker being assigned in the created spectrogram. For more clarity, prior to extracting the spectrogram image, portion of the audio file specific to the actual location and the duration is extracted to obtain extracted audio file. FIG. 3E, with reference to FIGS. 1 through 3D, depicts an extracted spectrogram image of the extracted audio file comprising the P2aE text information, in accordance to an embodiment of the present disclosure. Based on the extracted spectrogram image of the extracted audio file (or the muted audio file), an image of the P2aE text information is created and encrypted to obtain an encrypted image of the P2aE text information at step 212. When the image of the P2aE text information is created, this ensures that the P2aE text information is muted. The image of the P2aE text information is created in such a way that size of the created image of the P2aE text information is identical to duration of the extracted audio file (or the muted audio file), in one example embodiment. Assuming that expression 'one seven' is P2aE text information identified from the conservation pertaining to sensitive information of the entity, spectrogram image of the extracted audio file (e.g., audio containing 'one seven') or the muted audio file. FIG. 3F, with reference to FIGS. 1 through 3E, depicts an image of the P2aE text information comprised in the extracted audio file (or the muted audio file), in accordance to an embodiment of the present disclosure. More specifically, FIG. 3F depicts expression 'one seven' being converted in an image and represented as 17 (e.g., number 17). FIG. 3G, with reference to FIGS. 1 through 3F, depicts an encrypted image of the P2aE text information, in accordance to an embodiment of the present disclosure. More specifically, FIG. 3G depicts an encrypted image of the P2aE text information created using one or more encryption technique(s) stored in the memory 102 and executed for performing encryption thereof, using the system 100 of FIG. 1, in accordance with an embodiment of the present disclosure.

Figure 3H:
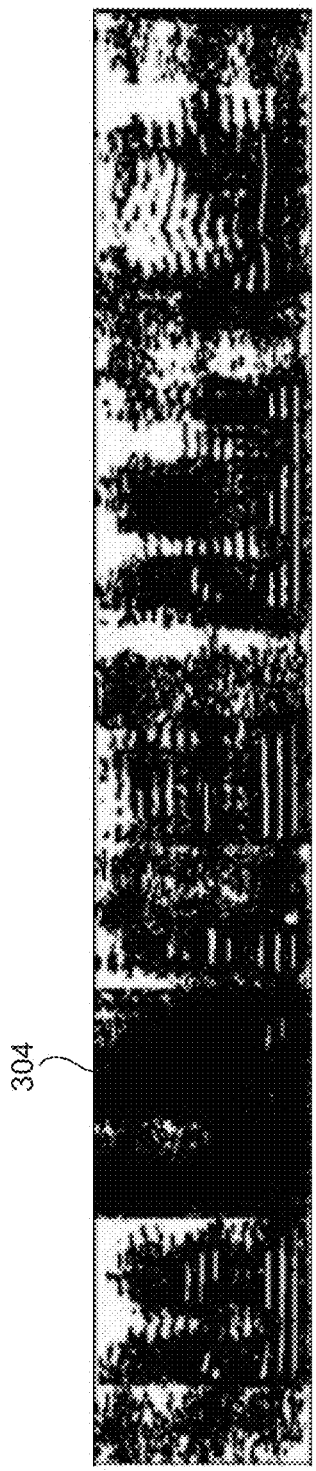
FIGS. 3H-3I depict spectrogram of the audio file before and after replacement of portion of the spectrogram with the encrypted image, in accordance with an embodiment of the present disclosure.
Figure 3I:
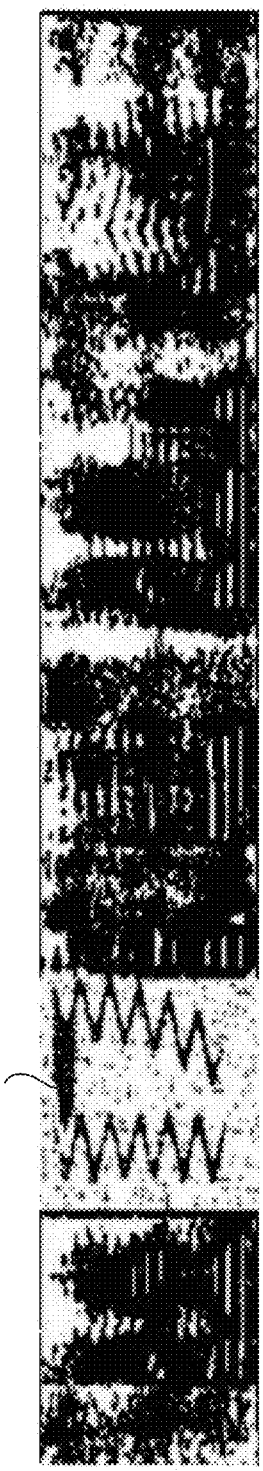

In an embodiment of the present disclosure, at step 214, the one or more hardware processors 104 substitute portion of the extracted spectrogram image of the audio file (e.g., original audio file, or input audio file or received audio file as depicted in FIG. 3A) with the encrypted image based on the actual location and the duration specific to the P2aE text information to obtain a modified spectrogram of the audio file. In other words, the extracted spectrogram image of the extracted audio file (or the muted audio file) used for muting is replaced with the encrypted image based on the actual location and the duration specific to the P2aE text information, in an example embodiment. Upon substituting, a modified spectrogram is obtained. FIGS. 3H-3I depict spectrogram of the audio file before and after replacement of portion of the spectrogram with the encrypted image, in accordance with an embodiment of the present disclosure. This encrypted image (picture) (a rendering of the P2aE text information) is represented by a block 306 is placed in the spectrogram obtained as described above in the same actual location and duration marked out for the P2aE text information. In other words, the portion of the spectrogram corresponding to the P2aE text information of the extracted audio file (or the muted audio file) is replaced with a picture (or image) of the P2aE text information as described in step 212 to obtain a modified spectrogram. In the present disclosure, the portion corresponding to "17" in the original audio file has been replaced by noise and the modified spectrogram is depicted in FIG. 4A, in accordance with an example embodiment of the present disclosure. More specifically, FIG. 4A, with reference to FIGS. 1 through 3I, depicts the input audio file with noise portion in place of the extracted audio file, in accordance with an embodiment of the present disclosure. The noise portion in the audio file is depicted by a block represented with 402. Using the modified spectrogram, the audio file is reconstructed to obtain a reconstructed audio file at step 216 and the reconstructed audio file is depicted in FIG. 4B, in accordance with an example embodiment of the present disclosure. In other words, the spectrogram of the original audio file received as input and the modified spectrogram output from the substitution step 214 may be utilized for reconstructing the audio file. In such cases, the portion of spectrogram of the original audio file for which muting is being performed may be disregarded and the modified spectrogram of step 214 is instead utilized for reconstructing the audio file, in one example embodiment. More specifically, FIG. 4B, with reference to FIGS. 1 through 4A, depicts a spectrogram of the input audio file with noise portion in accordance with an embodiment of the present disclosure. More specifically, block 404 depicts noise portion the spectrogram of the input audio file.

Now when the above reconstructed audio file is run, it plays gibberish in the portion which was initially marked to represent "17". This indicates that the P2aE text information "17" has been masked (or muted).

Figure 5A:
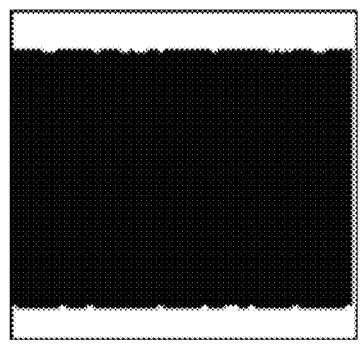
FIG. 5A depicts portion of the input audio file for performing decryption to obtain an interpretable P2aE information in accordance with an embodiment of the present disclosure.
Figure 5B:
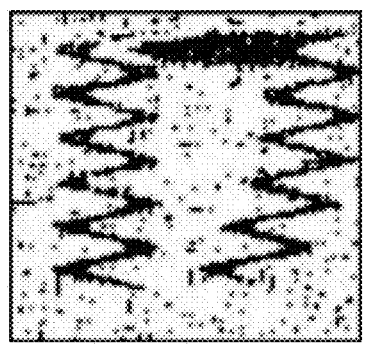
FIG. 5B depicts a spectrogram of the portion of the input audio file for performing decryption to obtain the interpretable P2aE information in accordance with an embodiment of the present disclosure.
Figure 5C:
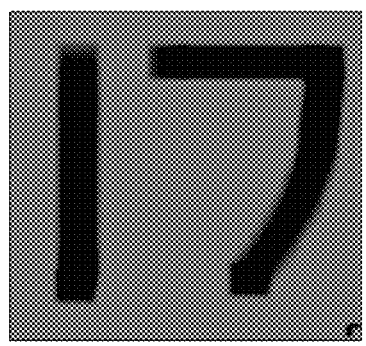
FIG. 5C depicts the interpretable P2aE text information in an image format, in accordance with an embodiment of the present disclosure.

If there is need to ascertain the P2aE text information while exercising an audit, the system 100 (or the hardware processors 104) create/creates a spectrogram of the reconstructed audio file, wherein portion of the spectrogram may be extracted that is specific to the P2aE text information. FIG. 5A, with reference to FIGS. 1 through 4B, depicts portion of the input audio file for performing decryption to obtain interpretable P2aE information in accordance with an embodiment of the present disclosure. FIG. 5B, with reference to FIGS. 1 through 5A, depicts a spectrogram of the portion of the input audio file for performing decryption to obtain interpretable P2aE information in accordance with an embodiment of the present disclosure. The portion corresponding to the location and duration of the P2aE text information may be decrypted using the key to obtain the P2aE information. In other words, a spectrogram of the reconstructed audio file is generated and the actual location and duration of the P2aE text information from the spectrogram of the reconstructed audio file is decrypted using an associated decryption key to obtain an interpretable P2aE text information (e.g., in this case 'one seven'). In an embodiment, the interpretable P2aE text information is of an image format as depicted in FIG. 5C. More specifically, FIG. 5C depicts an interpretable P2aE text information in an image format post decryption, in accordance with an embodiment of the present disclosure.

Since the reconstructed audio file stored in the memory 102 does not have the P2aE text information, the stored reconstructed audio file plays "noise" corresponding to the "picture/image of the P2aE text information". This process makes the stored reconstructed audio file devoid of any P2aE text information. As discussed above, reconstructing P2aE text information is possible by converting the stored reconstructed audio file into a spectrogram and then decrypting the same. This can be achieved by using the actual location and duration information (stored in the memory 102 or identifying the same by playing the reconstructed audio file). However, the P2aE text information may not be heard but can be visualized in the spectrogram as text as depicted in FIG. 5C. In an embodiment of the present disclosure, the step 202 till 216 describe the muting process for P2aE information contained in a conversation of an audio file (or multimedia file). The further steps of generating (or creating) spectrogram of the reconstructed audio file, decrypting the actual location and duration of the P2aE text information from the spectrogram of the reconstructed audio file using an associated decryption key to obtain an interpretable P2aE text information attribute to retrieval of muted information (e.g., in this case P2aE text information retrieval post muting/masking).

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

It is to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of CPUs.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor implemented method, comprising:
receiving conversation between multiple users, wherein the conversation is obtained from a multimedia file comprising an audio file or a video with the audio file;
analyzing the conversation to identify Private to an Entity (P2aE) text information in the conversation by performing analysis of inter and intra text information within the conversation including:
determining a contextual relationship across words in the conversation to identify that a specific word as the P2aE text information, wherein the specific word in the conversation is compared with subsequent words in the conversation; and
predicting that the specific word as the P2aE text information;
determining a mapping of the P2aE text information and corresponding actual location and duration thereof in the audio file;
assigning a marker to the actual location and duration of the P2aE text information in a spectrogram created from the audio file;
extracting a spectrogram image of an extracted audio file obtained based on the marker being assigned upon extracting a portion of the audio file specific to the actual location and the duration;
creating an image of the P2aE text information based on the extracted spectrogram image, and encrypting the image thereof to obtain an encrypted image, wherein size of the created image of the P2aE text information is identical to duration of the extracted audio file, wherein the P2aE text information pertains to sensitive information is an expression in the conversation and the expression is converted into an image and encrypted;

substituting portion of the extracted spectrogram image of the extracted audio file with the encrypted image based on the actual location and the duration specific to the P2aE text information to obtain a modified spectrogram of the extracted audio file; and reconstructing the audio file using the modified spectrogram and disregarding the portion of the extracted spectrogram image of the extracted audio file to obtain a reconstructed audio file.

2. The processor implemented method of claim 1, further comprising generating a spectrogram of the reconstructed audio file.

3. The processor implemented method of claim 2, further comprising decrypting the actual location and duration of the P2aE text information from the spectrogram of the reconstructed audio file using an associated decryption key to obtain an interpretable P2aE text information visualized in the spectrogram as text without audio.

4. The processor implemented method of claim 3, wherein the interpretable P2aE text information is of an image format.

5. A system, comprising:
a memory storing instructions;
one or more communication interfaces; and
one or more hardware processors coupled to the memory via the one or more communication interfaces, wherein the one or more hardware processors are configured by the instructions to:
  receive conversation between multiple users, wherein the conversation is obtained from a multimedia file comprising an audio file or a video with the audio file;
  analyze the conversation to identify Private to an Entity (P2aE) text information in the conversation by performing analysis of inter and intra text information within the conversation including:
    determining a contextual relationship across words in the conversation to identify that a specific word as the P2aE text information, wherein the specific word in the conversation is compared with subsequent words in the conversation; and
    predicting that the specific word as the P2aE text information;
  determine a mapping of the P2aE text information and corresponding actual location and duration thereof in the audio file;
  assign a marker to the actual location and duration of the P2aE text information in a spectrogram created from the audio file;
  extract a spectrogram image of an extracted audio file obtained based on the marker being assigned upon extracting a portion of the audio file specific to the actual location and the duration
  create an image of the P2aE text information based on the extracted spectrogram image, and encrypting the image thereof to obtain an encrypted image, wherein size of the created image of the P2aE text information is identical to duration of the extracted audio file, wherein the P2aE text information pertains to sensitive information is an expression in the conversation and the expression is converted into an image and encrypted;
  substitute portion of the extracted spectrogram image of the extracted audio file with the encrypted image based on the actual location and the duration specific to the P2aE text information to obtain a modified spectrogram of the extracted audio file; and
  reconstruct the audio file using the modified spectrogram and disregarding the portion of the extracted spectrogram image of the extracted audio file to obtain a reconstructed audio file.

6. The system of claim 5, wherein the one or more hardware processors are further configured by the instructions to generate a spectrogram of the reconstructed audio file.

7. The system of claim 6, wherein the one or more hardware processors are further configured by the instructions to decrypt the actual location and duration of the P2aE text information from the spectrogram of the reconstructed audio file using an associated decryption key to obtain an interpretable P2aE text information visualized in the spectrogram as text without audio.

8. The system of claim 7, wherein the interpretable P2aE text information is of an image format.

9. One or more non-transitory machine readable information storage mediums comprising one or more instructions which when executed by one or more hardware processors cause muting audio information in multimedia files and retrieval thereof, by:
  receiving conversation corresponding to multiple users, wherein the conversation is obtained from a multimedia file comprising an audio file or a video with the audio file;
  analyzing the conversation to identify Private to an Entity (P2aE) text information in the conversation by performing analysis of inter and intra text information within the conversation including:
    determining a contextual relationship across words in the conversation to identify that a specific word as the P2aE text information, wherein the specific word in the conversation is compared with subsequent words in the conversation; and
    predicting that the specific word as the P2aE text information;
  determining a mapping of the P2aE information and corresponding actual location and duration thereof in the audio file;
  assigning a marker to the actual location and duration of the P2aE text information in a spectrogram created from the audio file;
  extracting a spectrogram image of an extracted audio file (that needs to be muted) obtained based on the marker being assigned upon extracting a portion of the audio file specific to the actual location and the duration;
  creating an image of the P2aE text information based on the extracted spectrogram image, and encrypting the image thereof to obtain an encrypted image, wherein size of the created image of the P2aE text information is identical to duration of the extracted audio file, wherein the P2aE text information pertains to sensitive information is an expression in the conversation and the expression is converted into an image and encrypted;
  substituting portion of the extracted spectrogram image of the extracted audio file with the encrypted image based on the actual location and the duration specific to the P2aE text information to obtain a modified spectrogram of the extracted audio file; and
  reconstructing the audio file using the modified spectrogram and disregarding the portion of the extracted spectrogram image of the extracted audio file to obtain a reconstructed audio file.

10. The one or more non-transitory machine readable information storage mediums of claim 9, wherein the one or more instructions which when executed by the one or more hardware processors further cause generating a spectrogram of the reconstructed audio file.

11. The one or more non-transitory machine readable information storage mediums of claim 10, wherein the one or more instructions which when executed by the one or more hardware processors further cause decrypting the actual location and duration of the P2aE text information from the spectrogram of the reconstructed audio file using an associated decryption key to obtain an interpretable P2aE text information visualized in the spectrogram as text without audio.

12. The one or more non-transitory machine readable information storage mediums of claim 11, wherein the interpretable P2aE text information is of an image format.

\* \* \* \* \*